May 5, 1925.
A. L. HALVORSEN
1,536,213
PROCESS AND APPARATUS FOR MANUFACTURING HYDROGEN PEROXIDE
Filed July 9, 1921
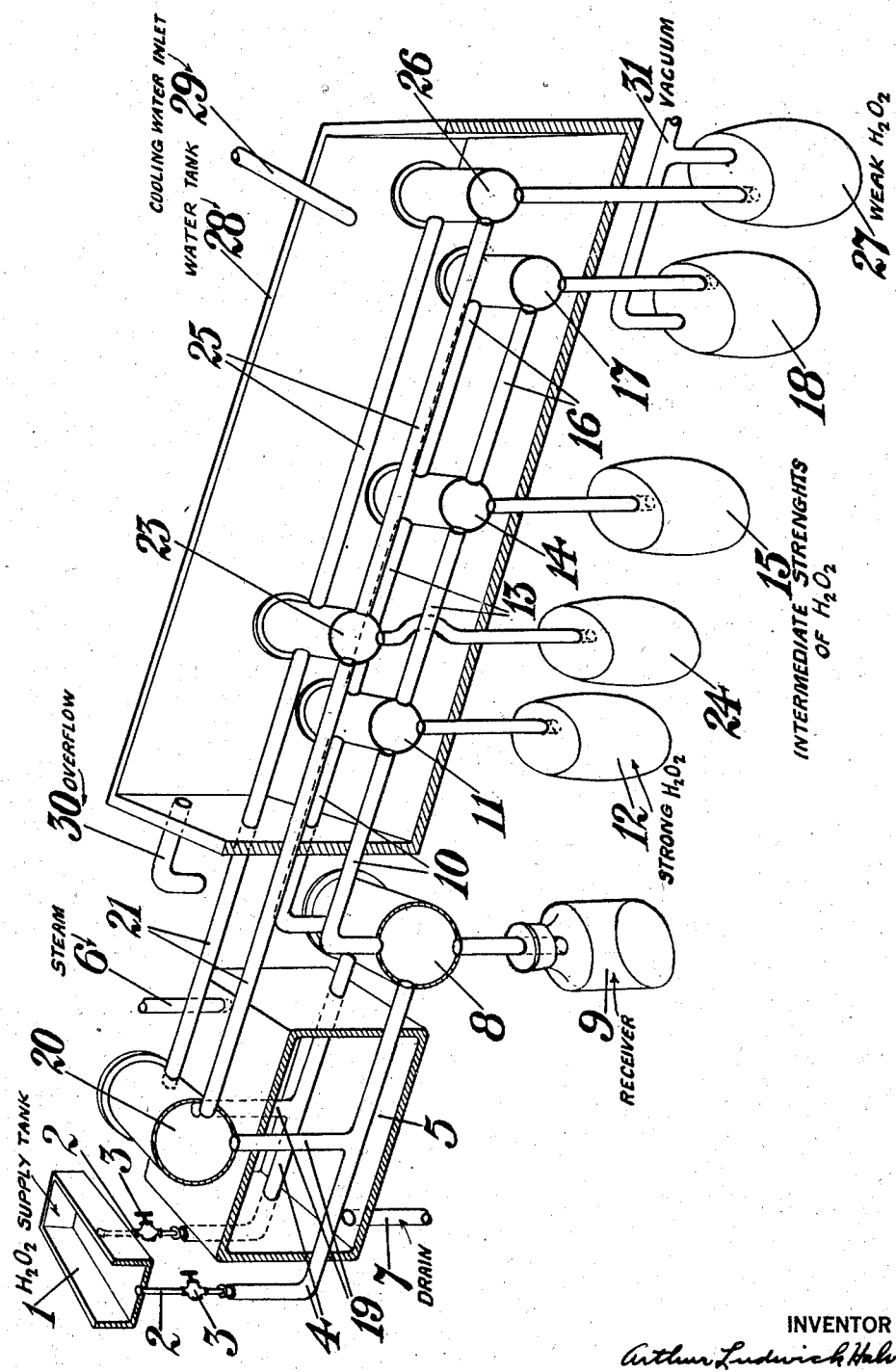
INVENTOR
Arthur Ludwick Halvorsen,
BY
ATTORNEY Patented May 5, 1925.

1,536,213

UNITED STATES PATENT OFFICE.

ARTHUR LUDWICK HALVORSEN, OF PERTH AMBOY, NEW JERSEY, ASSIGNOR TO ROESSLER & HASSLACHER CHEMICAL COMPANY, OF PERTH AMBOY, NEW JERSEY, A CORPORATION OF NEW YORK.

PROCESS AND APPARATUS FOR MANUFACTURING HYDROGEN PEROXIDE.

Application filed July 9, 1921. Serial No. 483,424.

*To all whom it may concern:*

Be it known that I, ARTHUR LUDWICK HALVORSEN, a subject of the King of Norway, and resident of Perth Amboy, in the county of Middlesex and State of New Jersey, have invented certain new and useful Improvements in Processes and Apparatus for Manufacturing Hydrogen Peroxide, of which the following is a specification.

This invention relates to the manufacture of solutions of hydrogen peroxide from peroxides of the alkali or alkali earth metals and has for its object the preparation of such solutions of high concentration and of exceedingly high purity.

It is known that it is possible to produce concentrated solutions of hydrogen peroxide from persulphuric acid or persulphates but the production of these raw materials requires intricate and costly equipment which must be operated continuously and on a large scale in order to be commercially successful. For these and other reasons, it has been conducted in only a few localities in the world where conditions are peculiarly favorable.

Other processes are known for producing hydrogen peroxide solutions, for example, the process which consists in treating a diluted mineral acid such as sulphuric acid with the peroxide of an alkali metal, such as sodium peroxide or of an alkali earth metal such as barium peroxide.

The product of this reaction consists of an aqueous solution containing, in addition to hydrogen peroxide, a certain amount of sulphate of sodium or barium, and, in addition, any impurities which may have been present in the peroxide, or the sulphuric acid, or in the water which was originally used. In the case of barium peroxide, the process has a further limitation that it is considered impracticable to produce from this raw material hydrogen peroxide of high concentration.

I have now discovered a method by which I can economically produce from either sodium peroxide or barium peroxide solutions of hydrogen peroxide of any desired concentration and of exceedingly high purity. As an illustration of my invention I shall describe the manufacture simultaneously of hydrogen peroxide solutions containing respectively 30% $H_2O_2$ and $7\frac{1}{2}\%$ $H_2O_2$ starting with sodium peroxide as raw material. However, the process is not restricted to these concentrations as it is possible to produce with the aid of my invention solutions which are stronger than 30% and weaker than $7\frac{1}{2}\%$ as far as may be desired.

The term alkaline peroxide as used in the claims refers both to peroxides of the alkaline earth metals such as calcium and barium peroxide and to peroxides of the alkali metals as sodium peroxide.

To practice my invention, I proceed as follows:

One hundred thirty five (135) pounds of sulphuric acid and five hundred (500) pounds of water are mixed and cooled to room temperature or lower. Sodium peroxide is then gradually added with stirring and cooling until the solution contains about one half percent free sulphuric acid. For this about one hundred pounds sodium peroxide is required. The solution is then filtered to remove the sodium sulphate and the filtrate is fortified with a second quantity of one hundred thirty five (135) pounds of sulphuric acid and treated with a second quantity of about one hundred (100) pounds of sodium peroxide with cooling and stirring as before until the solution contains about one half percent free sulphuric acid. The separated sodium sulphate is then again filtered off. Next the filtrate is cautiously treated with a further quantity of sodium peroxide until the acidity is reduced to about 0.005 percent free sulphuric acid, and is clarified by filtration through several thicknesses of cloth and paper which have previously been carefully washed free of all soluble matter. The sodium sulphate is washed free from hydrogen peroxide with water and the washings are utilized in making up the dilute acid in the succeeding operation. From the operation as described, I obtain between four hundred and twenty (420) pounds and four hundred and eighty (480) pounds of solution containing between 14% and 17% $H_2O_2$ in addition to the wash waters. This amount of hydrogen peroxide is between ninety percent and ninety-five percent of that which is theoretically obtainable from the sodium peroxide originally used.

The crude solution containing fourteen to seventeen percent of $H_2O_2$ I next distill in an apparatus of novel construction, one form of which is illustrated in the attached drawing, in which 1 is a supply tank of any suitable material such as wood which may be covered with lead or tin, 2 are feeding pipes provided with regulating valves 3 which communicate with the distilling pipes 4 which are surrounded by the steam chamber 5 which is provided with a steam inlet 6 and water outlet 7. The distilling pipes 4 lead into a trap 8 which is connected with a receiver 9 and to the condensing tubes 10 which are connected in turn to the manifold 11. The latter is connected to the receiver 12 and the condensing tubes 13 which lead into the manifold 14. The latter is connected into the receiver 15 and the condensing tubes 16 which lead into the manifold 17 which discharges into the receiver 18.

From a point which is intermediate in the distilling tubes 4 there are vapor pipes 19 which lead into the trap 20. From the latter, condensing pipes 21 lead into the manifold 23 which drains into the receiver 24. Also from the manifold 23, condenser pipes 25 lead into the manifold 26 which drains into the receiver 27. The manifolds 11, 14, 17, 23 and 26, as also the condenser pipes 10, 13, 16, 21, and 25 are submerged in the water tank 28 which is supplied with the water inlet 29 and the water outlet 30. The receivers 18 and 27 are connected to a vacuum pump through the pipe 31.

The pipes and manifolds should be constructed of material between which and the hydrogen peroxide solution or vapor, there is no deleterious action. I prefer to use tin, or antimony. or a non-deleterious alloy thereof such as britannia metal free of lead, zinc, etc., as such metals, if attacked by the solution, have a stabilizing effect thereon. The pipes I prefer to make about one inch bore. If they be entirely of tin, the wall thickness should be about $\frac{3}{32}$ inch in order to prevent them from collapsing when they are evacuated. The traps 8 and 20 should be of large diameter, preferably eight to ten inches, in order to prevent solid or liquid particles from being carried over into the condensing pipes by entrainment thereby contaminating the distillate. The other manifolds 11, 23, 14, 17 and 26 may be constructed of pipe with a bore of about two inches. All metallic joints must be made in a manner, as by welding or "burning," such that no deleteriously acting material comes into contact with the hydrogen peroxide solution or vapor.

The steam chamber 5 may be constructed of metal or of wood lined with a suitable material such as lead. The water tank likewise may be of metal or wood.

The receivers 12, 24, 15, 18 and 27 may be constructed of earthenware or of wood but they must be constructed in such a manner as to prevent them from collapsing when subjected to vacuum. The receiver 9 should be of glass in order to permit the operator to observe the rate of flow of liquid at that point.

The distilling operation I may conduct as follows:

From the supply tank 1, the crude solution is admitted to the distilling tube 4 at such a rate that no considerable amount of unevaporated liquid is discharged into the receiver 9. That portion of the liquid which is first to evaporate, passes as vapor into the trap 20 and thence into the condensing tubes 21 where partial condensation occurs, the condensate flowing through the manifold 23 into the receiver 24, while the uncondensed vapor passed thru the manifold 23 into the condenser tubes 25 where it is completely condensed, the condensate passing through the manifold 26 into the receiver 27.

That portion of the crude solution which is evaporated last in the distilling tubes 4 enters the second trap 8 and thence traverses the condensing pipes 10, 13, and 16. In these pipes, the vapor progressively condenses, the fractions flowing through the respective manifolds 11, 14 and 17 to the respective receivers 12, 15 and 18.

Vapors which are poor in $H_2O_2$ and rich in water are the first to distil and the last to condense, and conversely, vapors which are rich in $H_2O_2$ and poor in water are last to distil and first to condense. I obtain therefore, solutions of graded strength viz:—strongest solutions in receiver 12, weakest in receiver 27, and intermediate concentrations in 24, 15 and 18. If I start with a crude solution of the strength set forth above, I obtain ordinarily in receiver 12 a solution testing not less than thirty percent $H_2O_2$ and in receiver 27 a solution testing about six percent $H_2O_2$. Inasmuch as both these strengths are in accordance with commercial standards and usage, I can utilize fully the intermediate strengths by mixing with either the weaker or the stronger fraction or with both.

Solutions weaker than six percent $H_2O_2$ and stronger than thirty percent can be obtained by workers skilled in the art by positive control over the flow of the condensing water as will insure that the vapors are cooled very gradually during their passage through the condensing pipes.

It will be noted that in the above example I have started with a crude peroxide solution which was of relatively high concentration at the start, and have obtained therefrom two purified solutions, one of which is stronger and the other weaker than the initial solution. Both of these final solutions are valuable. If now, it be desired to start with a crude solution which is relatively dilute, I will still obtain as final products two solutions, one of which is more concentrated and one of which is more dilute than the original crude solution. In this event the more dilute solution may be so weak as to be of little commercial value and any hydrogen peroxide contained therein would represent a corresponding loss. To prevent such loss the vapors from the traps 8 and 20 may be rectified in a vertical distilling column of known type whereby the percentage of $H_2O_2$ in the dilute fraction can be increased as far as may be desired.

The sodium sulphate and other impurities contained in the original crude solution accumulate in the vaporizing pipes 4 which are periodically washed out into the receiver 9.

Various modifications and changes may be made in the proportions, materials, apparatus and dimensions given without departing from the scope of the invention, as so far as I am aware, it has not heretofore been known to obtain commercial solutions of $H_2O_2$ of varying strengths from a single solution in one operation.

What I claim is:

1. The method of distilling a solution containing hydrogen peroxide which consists in vaporizing and condensing the solution in passages lined with tin.

2. The method of producing an aqueous solution of hydrogen peroxide which consists in adding sodium peroxide to a solution of 135 parts by weight of sulphuric acid in 500 parts by weight of water at not greater than normal room temperature, until the acidity is reduced to about one-half per cent free sulphuric acid, removing the precipitated sulphate by filtration, adding to the filtrate 135 additional parts by weight of sulphuric acid and sufficient sodium peroxide to reduce the acidity to about one-half per cent, removing the precipitated sulphate by filtration, adding sufficient sodium peroxide to the filtrate to reduce the acidity to about five one-thousandths of one per cent, clarifying the resulting fluid by filtration, and distilling the clarified solution.

3. The method of distilling a solution of hydrogen peroxide which comprises heating a weakly acid stream of the liquid, vaporizing and separating portions rich in water, vaporizing substantially all portions rich in hydrogen peroxide and separately condensing the vapors in an apparatus coated with tin whereby a solution rich in hydrogen peroxide is obtained.

4. The method of distilling a purified and weakly acid solution of hydrogen peroxide which comprises vaporizing said solution, condensing the vapors rich in hydrogen peroxide before condensing the vapors rich in water and separately collecting the condensates to obtain solutions of hydrogen peroxides having different strengths, at least one of the steps of such process being conducted in vessels having walls containing tin.

5. The method which comprises distilling a solution of hydrogen peroxide and condensing the vapors, at least some of the hydrogen peroxide contacting, during said method, with a stabilizing material comprising tin.

6. The method which comprises distilling a solution of hydrogen peroxide and condensing the vapors in an apparatus lined with tin.

7. The method which comprises distilling a solution of hydrogen peroxide in a vessel the lining of which comprises tin.

8. The method which comprises distilling a weakly acid solution of hydrogen peroxide in a vessel having tin walls.

9. The method which comprises distilling a weakly acid solution of hydrogen peroxide under reduced pressure and separately condensing and collecting the vapors whereby a solution rich in hydrogen peroxide and a solution rich in water are obtained, at least some of the container walls contacting with vapors of hydrogen peroxide comprising tin.

10. The method which comprises distilling a hydrogen peroxide solution in such manner as to simultaneously obtain separately usable condensates having varying percentages of hydrogen peroxide, said process being conducted in vessels lined with a material having a stabilizing effect upon the hydrogen peroxide capable of enabling certain of said condensates to be obtained richer in hydrogen peroxide than the original.

Signed at Perth Amboy, in the county of Middlesex and State of New Jersey this 7th day of July, A. D. 1921.

ARTHUR LUDWICK HALVORSEN.